United States Patent Office 3,193,371
Patented July 6, 1965

3,193,371
TRIS(CYANOETHOXYMETHYL)BENZENES
Raymond L. Mayhew, Summit, N.J., and Earl P. Williams, Pen Argyl, Pa., assignors to General Aniline & Film Corporation, New York, N.Y., a corporation of Delaware
No Drawing. Filed Oct. 5, 1961, Ser. No. 143,039
17 Claims. (Cl. 71—2.3)

This invention relates to novel benzene derivatives. More particularly, it relates to novel substituted benzenes containing nitrile groups in the substituent groups.

Specifically, this invention relates to tris(cyanoethoxymethyl)benzenes, to a method for preparing these novel compounds, and to certain uses hereinafter described.

Compounds containing nitrile groups generally have toxic properties. However, they are usually non-specific in their action and are, therefore, of little value especially as pesticides, because of their deleterious effect on the environment as a whole. Accordingly, while such compounds might readily kill various pests, they are too dangerous to use because of their toxic effects on desirable plant and animal life.

While many good insecticides are available no effective nematocide has up to the present been discovered which is not only an efficient toxicant for nematodes, but which will not damage the crop plants which it is desired to protect against these pests. Many nematocides now in use sterilize the soil or are either nonselective herbicides or damage plant life to one or another significant degree.

Since nematodes cause heavy losses to agriculture amounting to several hundred million dollars annually, it will be readily apparent that a good nematocide which will be effective only against the pests, but which will cause no damage to plant life or which will be toxic only to undesired plants, such as weeds, would be of great benefit to the farmers.

A primary object of this invention is to provide novel nitrile-containing compounds. Another object is to provide a novel method for their preparation. A further object is to provide a number of novel nitrile-containing benzene derivatives which are effective pesticides. A still further object is to provide a number of novel nitrile-containing benzene derivatives which are not only effective pesticides, but which are also good herbicides. Other objects will be apparent to those skilled in the art from the description of the invention which follows.

In general, it has been discovered that when certain methylol-substituted benzenes are reacted with acrylonitrile there are obtained the corresponding cyanoethoxyethyl-substituted benzenes. More specifically, it has been discovered that when 1,2,4- and 1,3,5-trimethylolbenzene are reacted with three moles of acrylontrile there are obtained the corresponding tris(cyanoethoxymethyl)benzenes.

These compounds are not only effective nematocides but are also good pre- and post-emergence herbicides which exhibit a selective toxicity to weeds without damaging crop plants, such as corn, soybeans, wheat, and cotton.

The starting materials used in the present invention namely, 1,2,4- and 1,3,5-trimethylolbenzene can be prepared by the trimerization of propargyl alcohol. The two isomers are obtained as a mixture which may be separated, if desired, or used directly. As will be shown below, the mixture of tris(cyanoethoxymethyl)benzenes, obtained by reacting one mole of the unseparated mixture with 3 moles of acrylonitrile, is itself extremely effective.

In addition, 1,3,5-trimethylolbenzene can itself be prepared according to the disclosure in Beilstein, vol. VI, page 1127.

The invention is illustrated by the following examples:

EXAMPLE 1.—PREPARATION OF TRIS(CYANOETHOXYMETHYL)BENZENES

Into a one-liter flask provided with a stirrer, thermometer, dropping funnel, and a condenser equipped for vacuum take-off were charged 168.2 grams (1 mole) of trimerized propargyl alcohol comprising essentially a mixture of 1,2,4- and 1,3,5-trimethylolbenzene and 2 grams of 40% sodium hydroxide solution. The mixture was stirred well while the temperature was raised to 55° C. at 30 mm. pressure. The vacuum was then released and heating continued until the temperature rose to 85° C. at this time the dropwise addition of 160 grams (3 moles) of acrylonitrile was begun 1¾ hours being required to add the complete amount. The temperature during the addition of the acrylonitrile was maintained at 85–95° C. After all of the acrylonitrile had been added, the reaction mixture was held at a temperature of 85–95° C. for two hours longer, then cooled to 65° C., and the sodium hydroxide catalyst neutralized by the addition of 1.2 grams of glacial acetic acid. A small amount of residual salt was filtered off.

The product was then washed with methanol and dried by distilling off the low-boiling components at 100° C. and at a pressure of 30 mm.

Analysis of the product layer gave 11.8% N (calc.: 12.8% N) and an OH number equivalent to 42 mg. of KOH per gram. This corresponds to a 91% conversion of the trimethylolbenzene.

Toxicant compositions containing the above-produced tris(cyanoethoxymethyl)benzenes can be formulated as dispersions in either liquid or solid carriers. Thus the compounds can be employed as solutions in suitable inert solvents which do not react with the toxicants and which preferably do not have any harmful effects on plant life. Acetone is one such suitable solvent. Solutions prepared in this manner are effective in concentrations of about from 0.001 to 20% by weight. Preferred concentrations range about from 1 to 15%.

The toxicant can also be prepared as an aqueous emulsion when it is desired to drench the soil, as in greenhouse henches or the like.

Where it is desired to apply the toxicant as a dry formulation, it can be prepared as a dusting composition, using pumice, talc, or clay as solid carriers.

One extremely satisfactory method according to the present invention is to inject the nematocide into the soil. This is done by filling holes or other openings in the soil with the desired amounts of the toxicant.

EXAMPLE 2.—NEMATOCIDAL ACTIVITY

A brei of tomato roots, infested with root knot nematodes, *Meliodogyne incognita* was prepared by cutting roots of infested tomato plants into quarter inch lengths and then further macerating in a Waring Blendor for one minute.

Duplicate 100 gram samples of dry sand were mixed with 5 gram portions of the above described brei. The sand and brei were mechanically mixed by shaking for one minute in a closed Mason jar and then transferred to 2¼ inch clay pots. At this time, 50 mg. of the toxicant was added to the mixture in each pot. The pots were then individually wrapped in Saran and allowed to stand for 24 hours.

At the end of 24 hours the contents of each pot were transferred to stainless steel cylindrical screens each approximately 2½ inches high and 3½ inches in diameter. Each screen was then placed in the bottom half of a 9 cm. petri dish containing 25 ml. of water and covered with the petri dish cover. After a short time an additional 10 ml. of distilled water was added to each plate so that free water was available in the dish. After 24 hours, microscope counts were made of the living nematodes which had migrated through the screen into the petri dish. At least 10 fields were read, or 150 nematodes counted per dish. Duplicate tests were made for check purposes. The results are given in Table 1, below,

*Table 1*

| Compound | Nematodes in 10 fields | |
|---|---|---|
| | Living | Dead |
| Tris(cyanoethoxymethyl)benzenes | 1 | 36 |
| Blank | 80 | 35 |

The compounds of the present invention were also tested as herbicides for their effectiveness in pre- and post-emergence weed control and for their toxicity to desirable field crops. The test plants included broadleaf weeds and grasses, as well as seeds of corn, soybeans, wheat, and cotton. Soybean was also used when the plants were in the tri-foliate stage.

EXAMPLE 3

Flats one square foot in area were filled with a good soil mixture to a depth of 5 inches and packed solid with a firming board. Cotton, corn, soybeans, and wheat seeds were then planted in rows in separate flats at the rate of 15 cotton, corn, and soybean seeds and 3 cc. of wheat per flat. One half a level teaspoon of mixed weed seeds were scattered uniformly over the surface of the soil in each flat, a layer of soil ⅛ inch thick added to cover the seeds and then firmed. The flats were then watered lightly to induce germination.

After the flats had been prepared as just described, a sufficient amount of the mixture of isomers of tris(cyanoethoxymethyl)benzenes, prepared in Example 1, to provide exactly the equivalent of 16 pounds per acre for each flat (1 square foot) was dissolved in 3 ml. of acetone per flat, 3 ml. of 1% Igepal CO-630 a commercial wetting agent per flat added to the acetone solution, and then enough water added to provide a final volume of not less than 15 ml. per flat (200 gal. per acre).

Each flat was sprayed uniformly at a pressure of 16 pounds per square inch with 15 ml. of the composition prepared as above described and then cultured under standard greenhouse conditions. Water was added as needed.

The seeds thus treated were permitted to grow for about four weeks. At the end of that time, the flats were examined for weed control of both broad leaf weeds and grasses.

Germination counts were made of crop emergence and inhibition or suppression of growth and any other unusual effects were noted. Weed control was rated in terms of heavy, medium, light, or very light stands.

The above described tests were run to determine the preemergence effects of tris(cyanoethoxymethyl)benzene.

A similar series of tests were also made to determine the post-emergence effects of the compounds. These were carried out by permitting the seeds to emerge before treatment.

To provide a standard for comparison, a parallel series of experiments was performed with a known nematocide, 3-(p-chlorophenyl-1,1-dimethylurea (CMU), applied at the rate of 1 pound per acre.

The results of the pre-emergence tests are given in Table 2, below:

*Table 2*

| Chemical | Weeds | |
|---|---|---|
| | Broad leaf | Grasses |
| Tris(cyanoethoxymethyl)benzene mixture.[1] | Very light stand | Light stand. |
| CMU [2] | 100% (no stand) | 100% (no stand). |

[1] No injury noted to corn, soybean, cotton, and wheat.
[2] Heavy injury noted to corn, soybean, cotton, and wheat.

The results of the post-emergence tests are given in Table 3, below:

*Table 3*

| Chemical | Weeds | |
|---|---|---|
| | Broad leaf | Grasses |
| Tris(cyanoethoxymethyl)benzene mixture.[1] | Very light stand | Medium stand. |
| CMU [2] | 100% (no stand) | 100% (no stand). |

[1] No injury noted to corn, soybean, cotton, and wheat which were standing.
[2] Heavy injury noted to corn, soybean, cotton and wheat.

It is to be understood that the foregoing detailed description is given merely by way of illustration and that many variations may be made therein without departing from the spirit of this invention.

What is claimed is:

1. A compound selected from the group consisting of 1,2,4 - tris(cyanoethoxymethyl)benzene, 1,3,5 - tris(cyanoethoxymethyl)benzene, and mixtures thereof.

2. 1,2,4-tris(cyanoethoxymethyl)benzene.

3. 1,3,5-tris(cyanoethoxymethyl)benzene.

4. A mixture of 1,2,4-tris(cyanoethoxymethyl)benzene and 1,3,5-tris(cyanoethoxymethyl)benzene.

5. A method for controlling nematode infestations which comprises contacting nematodes with an active substance selected from the group consisting of 1,2,4-tris(cyanoethoxymethyl)benzene, 1,3,5 - tris(cyanoethoxymethyl)benzene, and mixtures thereof.

6. A method for controlling nematode infestations which comprises contacting nematodes with a mixture of 1,2,4 - tris(cyanoethoxymethyl)benzene and 1,3,5 - tris(cyanoethoxymethyl)benzene.

7. A method for controlling nematode infestations which comprises contacting nematode-infested soil with a mixture of 1,2,4-tris(cyanoethoxymethyl)benzene and 1,3,5-tris(cyanoethoxymethyl)benzene.

8. A method for controlling nematode infestations which comprises contacting the roots of nematode-infested plants with a mixture of 1,2,4-tris(cyanoethoxymethyl)benzene and 1,3,5-tris(cyanoethoxymethyl)benzene.

9. A method for controlling weeds which comprises applying to the soil of weed-infested areas an active substance selected from the group consisting of 1,2,4-tris(cyanoethoxymethyl)benzene, 1,3,5 - tris(cyanoethoxymethyl)benzene, and mixtures thereof.

10. A method for controlling weeds which comprises applying to the soil of weed-infested areas a mixture of 1,2,5-tris(cyanoethoxymethyl)benzene and 1,3,5-tris(cyanoethoxymethyl)benzene.

11. A method for controlling weed infestations which comprises applying a mixture of 1,2,4-tris(cyanoethoxymethyl)benzene and 1,3,5-tris(cyanoethoxymethyl)benzene to weed seed-infested soil prior to emergence.

12. A method for controlling weed infestations which comprises applying a mixture of 1,2,4-tris(cyanoethoxymethyl)benzene and 1,3,5 - tris(cyanoethoxymethyl)benzene to growing weeds.

13. A nematocidal and herbicidal composition consisting essentially of a substance selected from the group consisting of 1,2,4-tris(cyanoethoxymethyl)benzene, 1,3,5-tris(cyanoethoxymethyl)benzene, and mixtures thereof and a carrier therefor.

14. The nematocidal and herbicidal composition according to claim 13 wherein said carrier is a solid.

15. The nematocidal and herbicidal compositions according to claim 13 wherein said carrier is a liquid.

16. The nematocidal and herbicidal compositions according to claim 13 wherein the amount of said active substance presence is in the range of from about 0.001 to about 20% by weight.

17. A nematocidal and herbicidal composition comprising an aqueous dispersion of a mixture of 1,2,4-tris-(cyanoethoxymethyl)benzene and 1,3,5-tris(cyanoethoxymethyl)benzene, said dispersion containing said mixture in an amount in the range of from about 0.001 to about 20% by weight.

References Cited by the Examiner

UNITED STATES PATENTS

| | | | |
|---|---|---|---|
| 2,401,607 | 6/46 | Bruson | 260—465.6 |
| 2,818,422 | 12/57 | Heininger | 260—465 |
| 2,819,197 | 1/58 | Santmyer et al. | 167—13 |
| 2,819,291 | 1/58 | Heininger | 260—465 |
| 3,007,786 | 11/61 | Hamm et al. | 71—2.3 |
| 3,007,788 | 11/61 | Josephs | 71—2.3 |
| 3,021,258 | 2/62 | Haynes | 167—30 |
| 3,085,930 | 4/63 | Braunholtz et al. | 167—13 |
| 3,108,038 | 10/63 | Fielding | 167—30 |

FOREIGN PATENTS 811,350    8/51    Germany.

OTHER REFERENCES

Utermohlen: "J.A.C.S.," vol. 67, 1945, pages 1505–06.

JULIAN S. LEVITT, *Primary Examiner.*

M. A. BRINDISI, *Examiner.*